Jan. 8, 1946.   E. C. LEE   2,392,748
JOINT FOR ELECTRIC POWER CABLES MAINTAINED UNDER GAS PRESSURE
Filed Dec. 17, 1941   2 Sheets-Sheet 1
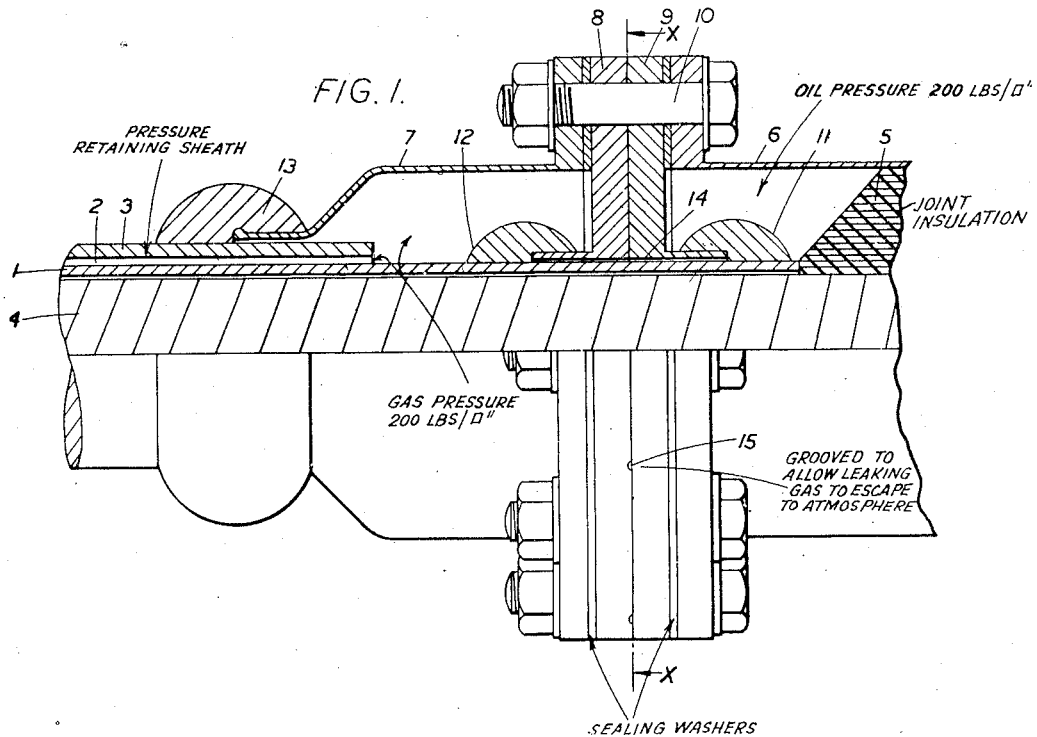
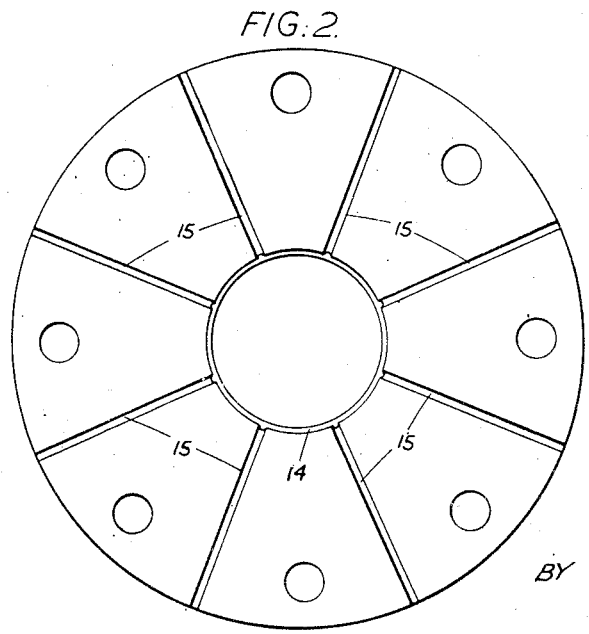

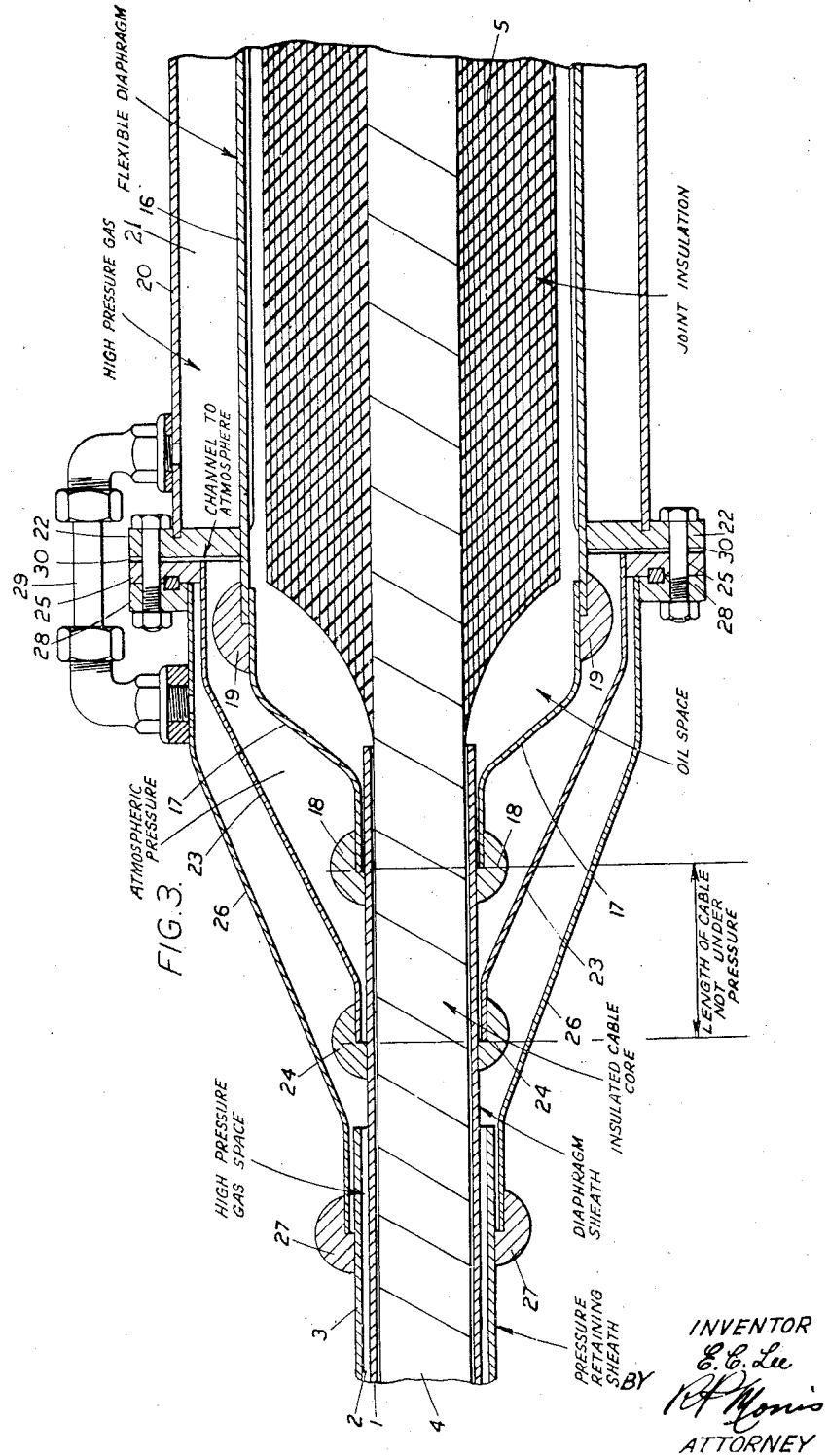

Patented Jan. 8, 1946

2,392,748

UNITED STATES PATENT OFFICE 2,392,748

JOINT FOR ELECTRIC POWER CABLES MAINTAINED UNDER GAS PRESSURE

Edwin Charles Lee, London, England, assignor to International Standard Electric Corporation, New York, N. Y.

Application December 17, 1941, Serial No. 423,260
In Great Britain February 14, 1941

7 Claims. (Cl. 174—22)

This invention relates to a method of jointing a length of electric power cable of the type in which the insulating material surrounding the conductor is kept under mechanical pressure by means of a gas under a pressure of 6 atmospheres or higher, separated from the cable insulation by an impervious and flexible wall. The invention also relates to a method of jointing a length of such a cable to a terminating device.

The impervious and flexible wall may be constituted by a lead sheath, since modern lead sheathing technique can be relied upon to produce an impervious wall, but the wiped or soldered junctions between this impervious wall and a sleeve applied over a joint or termination of the cable cannot be relied upon to be impervious to high gas pressure. There is no means of testing a completed joint between two lengths of cable or a completed cable termination to determine whether the gas will penetrate thereinto, before the cable is used. As pressures over 6 atmospheres and frequently 12 to 14 atmospheres are employed, and penetration of the gas into the cable dielectric would eventually result in breakdown of the cable, there is considerable difficulty in making satisfactory joints and terminations for cables of the type referred to. It is an object of the present invention to remove this difficulty and to enable ordinary wiped or soldered connections to be employed.

According to the present invention, a method of jointing or terminating a length of cable of the type set forth comprises forming a wiped or soldered joint between a sheath surrounding the insulation of the cable joint or termination and the flexible and impervious wall of a length of cable, and isolating said wiped or soldered joint from the gas pressure space surrounding the said wall by a space at a pressure of the order of 1 atmosphere.

The nature of the invention will be better understood from the following description taken in conjunction with the accompanying drawings which show the application of the invention to different types of joints in an electric power cable of the type referred to.

Figure 1 shows in half-section a portion of a joint, in which the insulation of the joint has sufficiently high breakdown strength to permit of normal working without being subjected to external gas pressure.

Figure 2 is a section on the line X—X of Figure 1.

Figure 3 shows in section a joint of the kind in which the insulation must be compressed by external gas pressure as in the cable to ensure adequate breakdown strength.

Referring now to Figure 1, the cable, two lengths of which are to be joined, consists of a conductor surrounded by insulation 4 which may consist of paper impregnated with any well-known cable compound. Surrounding this insulation is a flexible lead sheath 1 between which and an outer protective and pressure retaining sheath 3 is a space 2 filled with gas under pressure. In forming a joint the pressure retaining sheath 3 and flexible lead sheath 1 are stripped back from each length of cable. The two lengths of cable are joined together and insulation 5 is formed around the joint in any well-known manner. The nature of this insulation and the manner in which it is built up around the joint form no part of the present invention and need not, therefore, be further described.

In the example shown in Figure 1 it is assumed that the breakdown strength of the insulation 5 is sufficiently great to permit of normal working without subjection to gas pressure, i. e. the breakdown strength of this insulation is substantially greater than that of the normal insulation 4 of a cable length.

It is known to form a gas seal between the space 2 filled with gas under pressure and the insulation 5 of the joint by placing two metal flanged collars 8, 9 over the flexible lead sheath 1. The flanges of these collars are fixed to the sheath 1 by wiped joints 11 and 12. A brass sleeve 6 is placed over the joint insulation 5, and a second brass sleeve 7 over the end of the cable. The brass sleeves 6 and 7 are fixed to the flanges 8, 9 and the flanges held tightly together by bolts 10. The sleeve 7 is then connected to the outer lead sheath 3 of the cable by a wiped joint 13.

The wiped joints 12 and 11 may not, however, be gas tight under high gas pressure. It is very difficult to ensure that they are gas tight, and if gas can penetrate through them, gas can pass from the space within the sleeve 7, which space is under considerable gas pressure, through the wiped joint 12 between the flanges of the collars 8, 9 and the sheath 1, through the wiped joint 11 into the insulation 5. The same considerations apply to soldered joints between the flanges 8, 9 and an impervious sheath 1.

In accordance with the present invention, the collars 8, 9 are formed as shown in Figure 2. A groove 14 is formed between the flanges of the collars and the sheath 1, and the abutting faces of the collars 8 and 9 are formed with corresponding grooves 15 which, when the collars 8, 9 are bolted together, form channels communicating with the groove 14 and with the atmosphere. Thus, there is formed between the joint 11 surrounding the insulation 5 and the space 2 under gas pressure, a space at atmospheric pressure, which in this embodiment takes the form of a chamber communicating with the atmosphere. The joint 11 is thus not under gas pressure and any gas leaking through the joint 12 enters the chamber formed by the groove 14 and escapes to the atmosphere.

The arrangement shown in Figure 3 is for use with a cable joint the insulation of which is comparable in breakdown strength to that of the cable lengths being joined, and thus cannot be maintained under pressure equal to that of those cable lengths.

In this arrangement also the two lengths of cable are joined together and insulation 5 formed around the joint in any well known manner. A short brass sleeve 17 is joined to the flexible and impervious wall 1 surrounding the cable insulation 4 by a wiped joint 18. A flexible sheath 16 is placed over the joint insulation 5 and joined to the brass sleeve 17 by a wiped joint 19. The flexible sheath 16 is surrounded by an outer sheath 20 spaced therefrom to provide a space 21 filled with gas under pressure. This space 21 is enclosed by a collar 22 tightened over the sheath 16 and firmly secured in gas tight manner to the sheath 20. Over the brass sleeve 17 and spaced therefrom is placed a second brass sleeve 23 secured to the flexible sheath 1 by a wiped joint 24. The sleeve 23 ends contiguous to the collar 22 and is surrounded at this end by a collar 25. Exterior to the sleeve 23 is a third sleeve 26, secured to the outer sheath 3 of the cable by means of a wiped joint 27. A collar 28 fits over the sleeve 26, and the three collars 22, 25 and 28 are bolted together as shown. The space between the sleeves 23 and 26 thus communicates with the space 2 and is filled with gas under pressure. A connecting pipe 29 fitted in the sleeves 26 and 20 in a gas tight manner ensures that the space 21 surrounding the sheath 16 is also under the same gas pressure. The collars 22 and 25 are formed on their abutting surfaces with grooves which form channels 30 connecting the space between sleeves 23 and 17 to the atmosphere. Thus the wiped joints 18 and 19 joining the sheath 1 and the sleeve 17, and the sleeve 17 and the sheath 16 respectively are exposed only to atmospheric pressure, and any gas leaking past the wiped joint 24 escapes into the atmosphere instead of penetrating the wiped joint 18.

It will be noted that there is a short length of cable shown in Figure 3 adjacent to the joint, which length is not subject to compression. This is, however, an advantage rather than a disadvantage, since it forms a junction between two pressure systems of different amplitudes of thermal expansion and contraction under current loading cycles, and utilises longitudinal flow as its means of relief for thermal expansion.

Although the invention has been described with particular reference to joints between two cable lengths, it is clear that one of the joined cables could as well be a termination as an extended length of cable. For example, the conductor surrounded by insulation 4 shown in Figs. 1 and 3 need not necessarily extend for a long distance to the left, but might terminate in a cable termination of any suitable type at a very short distance to the left of the joint. As such terminations are well known, it is not necessary to illustrate one; and it will be understood that the joints according to this invention are equally applicable regardless of whether the conductor surrounded by insulation 4 is of extended length as in a length of cable or is of short length as used in a termination.

What is claimed is:

1. A joint for joining to an electric cable conductor, another electric cable conductor of the type having a flexible and impervious wall surrounding the cable, said joint comprising insulation surrounding the joined conductor ends, a sleeve surrounding the insulation, means for forming a closed chamber at the end of the insulation between the sleeve and the impervious wall, a seal between the wall and the closing means to enable the chamber to withstand oil pressure, a second chamber around a portion of said impervious wall beyond the end of the first mentioned chamber, said second chamber being provided with a seal capable of maintaining said second chamber under gas pressure, said chambers being separated by a space maintained at a pressure of about one atmosphere.

2. A joint according to claim 1 in which said seals are wiped or soldered joints.

3. A joint for joining to an electric cable conductor, another electric cable conductor of the type having a flexible and impervious wall around the cable, said joint comprising insulation surrounding the joined conductor ends, a sleeve surrounding the insulation, a collar placed around said wall, said sleeve connecting with said collar to form a chamber at the end of the insulation defined by the insulation the sleeve the collar and the wall, said collar being joined to said wall by a wiped or soldered joint to form an oil seal for said chamber, a gas pressure chamber located at the side of said collar opposite the first mentioned chamber, and another wiped or soldered joint for joining said collar to said wall at the second mentioned chamber, said collar being formed with a groove surrounding the wall between the seals and a passageway through the wall from said groove to the atmosphere.

4. A joint for joining an electrical conductor to an electric cable, said cable being of the type having a flexible and impervious wall around the insulated cable conductor and an outer gas pressure retaining sheath around said flexible wall, said sheath being discontinued so that there is a space between the end of the sheath and the connection of the cable to the conductor, a collar around the flexible wall at said space, a sleeve joined to said collar and around the conductor connection forming a closed chamber, another sleeve extending from the opposite side of the collar from said first sleeve to the sheath forming a second chamber filled with gas pressure, said second chamber being sealed at the junction of said collar and said wall with a wiped or soldered joint, and means forming a passageway for gas leakage, said means extending from beneath said last mentioned joint to the atmosphere.

5. A joint for joining an electrical conductor to an electric cable, said cable being of the type having a flexible and impervious wall around the insulated cable conductor and an outer gas pressure retaining sheath around said flexible wall, said sheath being discontinued so that there is a space between the end of the sheath and the connection of the cable to the conductor, an enclosure around the conductor connection and sealed by a wiped or soldered joint to said wall to retain oil, a gas chamber in communication with the gas space between the sheath and the wall, said gas chamber also being sealed to said wall to retain the gas, a space between the oil chamber seal and the gas chamber seal, and means forming a passage extending from said space to the atmosphere through which gas escaping through the gas chamber seal passes to the atmosphere.

6. In a joint structure for electric power cables, the combination of an insulated cable, a first sheath spaced from and surrounding said cable, a second sheath spaced from and surrounding said first sheath, said first sheath extending into the joint structure for a greater distance than said second sheath, a radially extending collar, means including a wiped joint, interconnecting said first sheath with one side of said collar, a sleeve surrounding said first sheath and attached at one end to the end of said second sheath and at its other end to the same side of said collar at a point radially outwardly displaced from said interconnecting means, means forming a passage from beneath said wiped joint out through said collar to the atmosphere, a third sheath longitudinally spaced from said second sheath and surrounding another portion of said cable, and means interconnecting said third sheath with the other side of said collar.

7. The combination according to claim 6, in which said passage-forming means includes radially extending grooves in said collar.

EDWIN CHARLES LEE.